US008868234B2

(12) United States Patent
Sanders et al.

(10) Patent No.: US 8,868,234 B2
(45) Date of Patent: Oct. 21, 2014

(54) COMMUNICATION SYSTEM AND METHOD

(75) Inventors: Adam M. Sanders, Huntersville, NC (US); Philip A. Strawser, Houston, TX (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 191 days.

(21) Appl. No.: 13/459,557

(22) Filed: Apr. 30, 2012

(65) Prior Publication Data

US 2013/0006417 A1  Jan. 3, 2013

Related U.S. Application Data

(60) Provisional application No. 61/503,696, filed on Jul. 1, 2011.

(51) Int. Cl.
*G06F 19/00* (2011.01)
*H04L 12/801* (2013.01)
*H04L 12/851* (2013.01)

(52) U.S. Cl.
CPC ............ *H04L 47/13* (2013.01); *H04L 47/2433* (2013.01); *Y10S 901/06* (2013.01); *Y10S 901/08* (2013.01)
USPC ........... 700/245; 700/246; 700/247; 700/249; 700/257; 700/259; 700/260; 901/6; 901/8

(58) Field of Classification Search
CPC ............................. G06N 3/008; G05D 1/0246

USPC ......... 700/245, 246, 247, 249, 257, 259, 260; 901/8, 6

See application file for complete search history.

(56) References Cited

U.S. PATENT DOCUMENTS

| | | | |
|---|---|---|---|
| 6,084,631 A * | 7/2000 | Tonkin et al. | 348/211.6 |
| 7,839,890 B1 | 11/2010 | Neitzel et al. | |
| 2006/0184272 A1* | 8/2006 | Okazaki et al. | 700/245 |
| 2007/0097907 A1 | 5/2007 | Cummings | |
| 2008/0084819 A1 | 4/2008 | Parizhsky et al. | |
| 2010/0321402 A1* | 12/2010 | Han et al. | 345/619 |
| 2011/0040427 A1* | 2/2011 | Ben-Tzvi | 701/2 |

FOREIGN PATENT DOCUMENTS

| | | |
|---|---|---|
| JP | H06320457 A | 11/1994 |
| JP | 2006203404 A | 8/2006 |
| JP | 2009217713 A | 9/2009 |

* cited by examiner

*Primary Examiner* — Khoi Tran
*Assistant Examiner* — Jorge Peche
(74) *Attorney, Agent, or Firm* — Quinn Law Group, PLLC

(57) ABSTRACT

A communication system for communicating over high-latency, low bandwidth networks includes a communications processor configured to receive a collection of data from a local system, and a transceiver in communication with the communications processor. The transceiver is configured to transmit and receive data over a network according to a plurality of communication parameters. The communications processor is configured to divide the collection of data into a plurality of data streams; assign a priority level to each of the respective data streams, where the priority level reflects the criticality of the respective data stream; and modify a communication parameter of at least one of the plurality of data streams according to the priority of the at least one data stream.

10 Claims, 3 Drawing Sheets

COMMUNICATION SYSTEM AND METHOD

CROSS REFERENCE TO RELATED APPLICATIONS

This application claims the benefit of U.S. Provisional Application No. 61/503,696, filed Jul. 1, 2011, which is hereby incorporated by reference in its entirety.

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefore.

TECHNICAL FIELD

The present invention relates generally to a communication system and protocol optimized for bandwidth-constrained network communication.

BACKGROUND

In high-latency, low-bandwidth networks, such as may be employed when communicating with an extra-terrestrial object via wireless communication over hundreds or thousands of miles, it may be difficult or expensive to communicate large quantities of information in a reliable manner. Each data stream that is transmitted may require error correcting, redundancy, or other bandwidth-heavy techniques to ensure the information received matches the information transmitted. This may often lead to a total reduction of communicated information, with little regard for the importance of the underlying data.

SUMMARY

A communication system for communicating over high-latency, low bandwidth networks includes a communications processor configured to receive a collection of data from a local system, and a transceiver in communication with the communications processor.

The transceiver is configured to transmit and receive data over a network according to a plurality of communication parameters. The communications processor is configured to divide the collection of data into a plurality of data streams; assign a priority level to each of the respective data streams, where the priority level reflects the criticality of the respective data stream; and modify a communication parameter of at least one of the plurality of data streams according to the priority of the at least one data stream. In one configuration, the plurality of communication parameters may include at least one of a communication protocol, a transmission priority, a transmission method, a transmission format, a transmission frequency, an update frequency, a level of redundancy, and a level of error checking.

The communications processor may further include a processing module that is configured to receive a data stream and to perform a bandwidth conserving technique to minimize the amount of redundant information within the transmitted data stream. Such a bandwidth conserving technique may include: parsing a data stream into a plurality of objects; comparing an object to a previous version of the object to detect a change in the object; and transmitting the object only if the change from the previously recorded version of the object exceeds a threshold.

In one configuration, the local system may be a robotic system that includes a dexterous robot and a controller. The dexterous robot may likewise include 42 degrees of freedom. In this manner, the plurality of data streams may include a visual data stream, an operational status data stream, and a command and control data stream.

Additionally, a method for communicating data over a high-latency, low-bandwidth network may include: dividing the data into a plurality of data streams, where each data stream is configured to be respectively transmitted across a network according to a plurality of communication parameters; assigning a priority to each respective data stream, with the priority reflecting the criticality of the respective data stream; adapting a communication parameter for at least one of the plurality of data streams to reflect the priority of the at least one data stream; and transmitting the plurality of data streams using the communication parameters.

The above features and advantages and other features and advantages of the present invention are readily apparent from the following detailed description of the best modes for carrying out the invention when taken in connection with the accompanying drawings.

DETAILED DESCRIPTION

Figure 1:
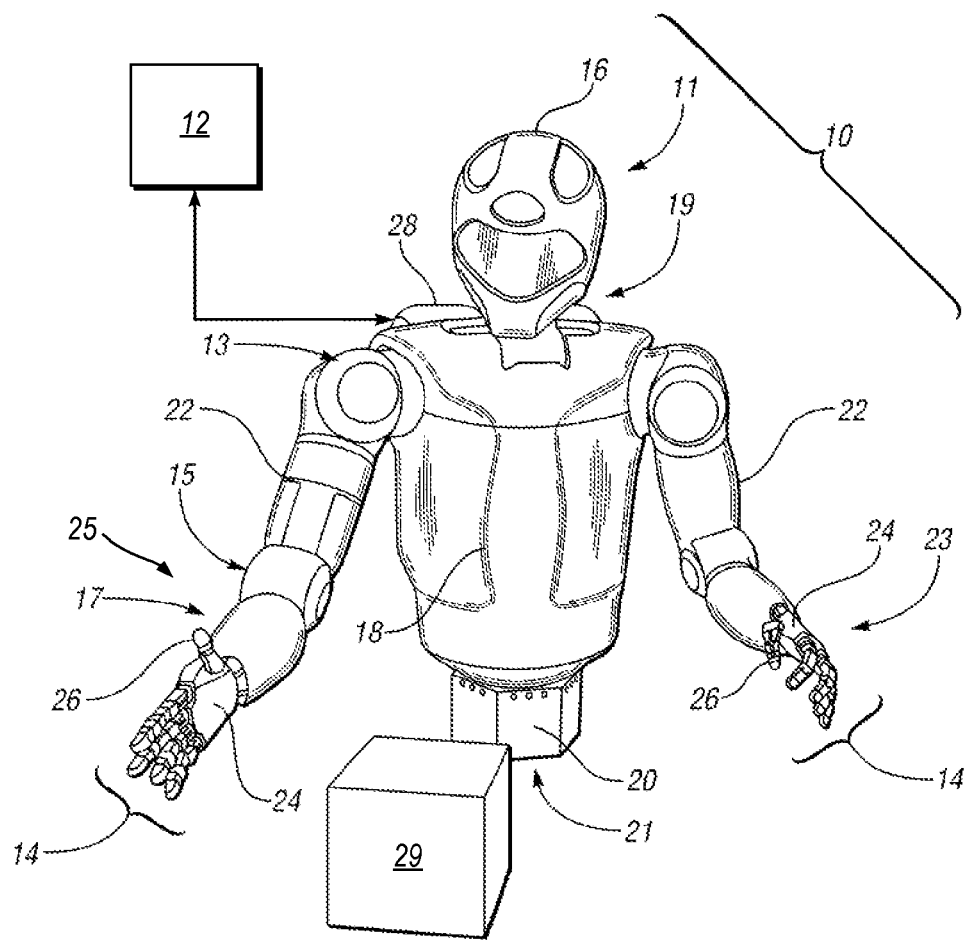
FIG. 1 is a schematic perspective view of a robotic system.

With reference to the drawings, wherein like reference numbers refer to the same or similar components throughout the several views, and beginning with FIG. 1, a robotic system 10 is shown that includes a dexterous robot 11 and a controller 12. The robot 11 may include various manipulators, including a plurality of tendon-driven fingers 14. The controller 12 may be embodied as a processor or other suitable control device that may be in electrical communication with the robot 11. The controller 12 may include or embody one or more control systems that may each execute one or more control routines.

The controller 12 may be operable to manipulate one or more robotically actuated joints of the robot 11 (e.g., shoulder joint 13, elbow joint 15, wrist joint 17, neck joint 19, waist joint 21, or joints 23 of the fingers 14) in a coordinated manner that may accomplish a task. For example, when grasping an object 29, the controller may manipulate the fingers 14 of the dexterous robot 11, such as by dynamically varying the tension applied through one or more tendons (not shown). The controller 12 may employ, for example and without limitation, force-based control and/or position-based control to regulate the tension maintained within the tendons. Such control techniques may be based on closed-loop force and/or position feedback that may refine the controllability. Within the controller 12, the particular control law being applied, i.e., force or position, may be selected based on the type of actuation, and the availability of feedback from sensors disposed proximate to the motion.

The robot 11 shown in FIG. 1 may be configured with a human-like appearance, and with human-like levels of dexterity to the extent necessary for completing a given work task. As such, the robot 11 may be configured to mimic the movements of a remote human operator/user, and provide the user with a sense that they are directly interacting with the environment of the robot 11—particularly when the motion of the robot is programmed to closely approximate the user's motion. Through this telerobotic presence, a user may accomplish tasks via the robot 11 in environments that may be too harsh or too dangerous for routine human presence.

The robot 11 may have a plurality of independently—and interdependently—moveable actuator-driven robotic joints that may each have one or more degrees-of-freedom (DOF). As such, the robot 11 may be capable of redundant motion, where certain joints may have overlapping ranges of motion. For example, certain compliant joints such as the shoulder joint 13 and the elbow joint 15 may have at least two DOF in the form of pitch and roll. Likewise, the neck joint 19 may have at least three DOF, while the waist and wrist 21 and 17, respectively may have one or more DOF. Depending on task complexity, the robot 11 may move with over 42 DOF. Each robotic joint may be internally driven by one or more actuators, such as motors, linear actuators, rotary actuators, and the like.

In an embodiment, the robot 11 may include just a lower arm assembly 25. In another embodiment, the robot 11 may include additional human-like components such as a head 16, a torso 18, a waist 20, arms 22, hands 24, fingers 14, and opposable thumbs 26, with the various joints noted above being disposed within or between these components. As with a human, both arms 22 and other components may have ranges of motion that overlap to some extent. The robot 11 may also include a task-suitable fixture or base (not shown) such as legs, treads, or another moveable or fixed base depending on the particular application or intended use of the robot. A power supply 28 may be integrally mounted to the robot 11, e.g., a rechargeable battery pack carried or worn on the back of the torso 18 or another suitable energy supply, or which may be attached remotely through a tethering cable, to provide sufficient electrical energy to the various joints for movement of the same.

The controller 12 may be embodied as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

While shown as a single device in FIG. 1 for simplicity and clarity the various elements of control system 12 may be distributed over as many different hardware and software components as are required to optimally control the robot 11. The individual control routines/systems resident in the controller 12 or readily accessible thereby may be stored in ROM or other suitable tangible memory location and/or memory device, and automatically executed by associated hardware components of the control system to provide the respective control functionality.

Figure 2:
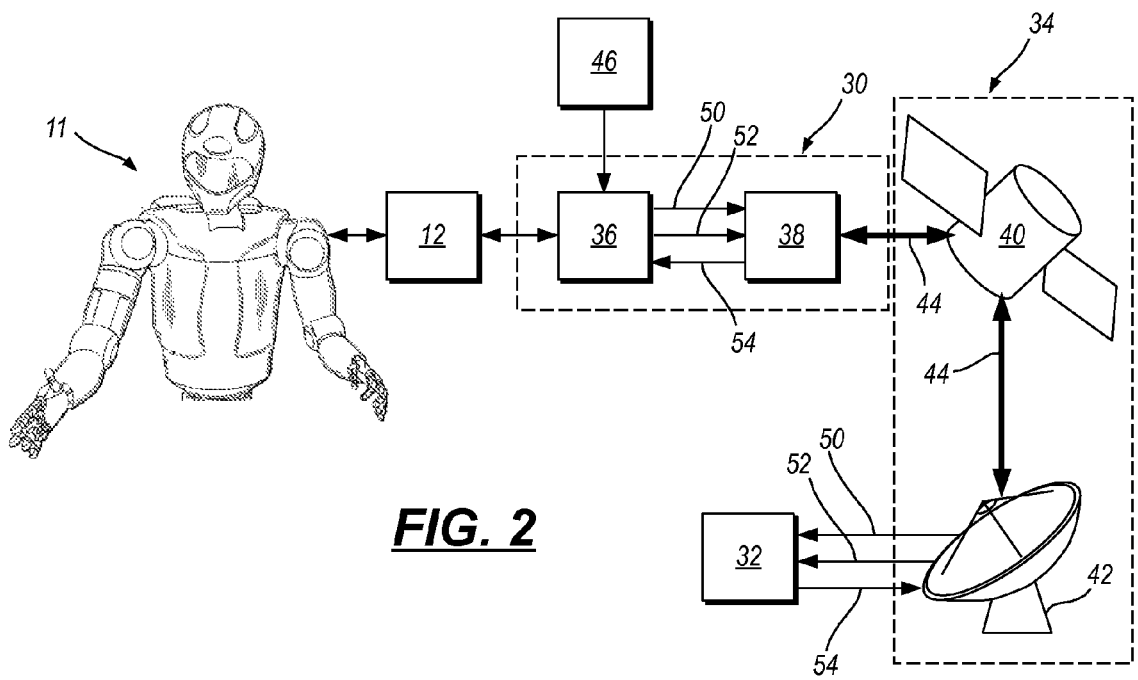
FIG. 2 is a schematic diagram of a robotic system coupled with a remote control terminal over a network.

FIG. 2 illustrates a communication system 30 that may, for example, enable a remote control terminal 32 to control the behavior and operation of the dexterous robot 11 over a high-latency, low-bandwidth network 34. The system 30 may be equally applicable to other systems that transmit multiple types of data over a network connection. As shown, the communication system 30 may include at least a communications processor 36 and a transceiver 38 that may be local to the robot 11. Additionally, it is contemplated that a similar communication system (not shown) may be disposed proximate to (or integrated with) the remote control station 32 to facilitate bi-directional communication. Similar to the controller 12, the communications processor 36 may be embodied as one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

The transceiver 38 may be a wireless or wired transceiver that may operate using any known or hereinafter developed data transmission protocols. The transceiver 38 may include any or all necessary circuitry to allow the communication system 30 to transmit and/or receive a data signal over a distance. For example, the transceiver 38 may use one or more microprocessors, read only memory (ROM), random access memory (RAM), electrically-erasable programmable read only memory (EEPROM), high-speed clocks, signal buffers, transmitting antennas, receiving antennas, signal amplifiers, signal boosters, or other related I/O components. In an embodiment, the transceiver 38 may be adapted to facilitate bi-directional data communication in an extra-terrestrial environment, where the data may need to be transmitted across several thousand or several million miles.

When the dexterous robot 11 is operating in an extra-terrestrial environment, such as aboard the International Space Station, the network 34 may include, for example, one or more relay satellites 40 that may be in bidirectional communication with the local communication system 30. Additionally, the network 34 may include one or more terrestrial communication antennas 42 that may be in bidirectional communication with the one or more relay satellites 40. The network 34 may further include any relays, switches, transceivers, host computers, or communication circuitry that may be required to facilitate the bidirectional transmission of data. In an embodiment, the communication link 44 that connects the various components of the network 34 may be a multi-channel data link (shown schematically in FIG. 2 as a thicker transmission arrow), where each data channel may have its own respective bandwidth, frequency, and/or transmission priority on the network 34. In an embodiment where the network 34 physically span hundreds or thousands of miles, the overall network bandwidth, or the bandwidth of each channel, may be significantly limited due to the cost of transmitting a high-powered signal, along with the need to incorporate significant error checking, noise filtering, and/or redundancy to reduce the likelihood of signal errors and/or data corruption.

The remote control terminal 32 may allow a user to control the behavior and operation of the dexterous robot 11, while also providing the user with real-time telepresence through visual and operational feedback obtained by the robot 11. The remote control terminal 32 may include, for example, a human-machine interface (HMI), such as a joystick, mouse, instrumented gloves (allowing the system to record the user's hand/arm motions), or any other similar manner of capturing a user's intended motions. Additionally, the remote control terminal 32 may include one or more visual displays, such as computer monitors or stereoscopic goggles, which may provide the user with visual and operational feedback. The visual feedback, for example, may be captured by stereoscopic cameras positioned in the head 16 of the robot 11, and may provide the user with a sense of actual presence. The operational feedback may be informational system-level feedback that may be generated by the controller 12 that may relate to the functional disposition of the robot 11 or to the operational status of the various control systems/routines that may be directly controlling the robot's behavior.

The communication system 30 may also accept input from a local control terminal 46 that may be similar in function and operation to the remote control terminal 32. The terms "local" and "remote" are specified relative to the physical position of the robot 11. As such, the local control terminal 46 may be in relatively close proximity to the controlled robot 11 (i.e., a few feet to a few hundred feet), whereas, the remote control terminal 32 may be separated from the robot 11 by a much greater distance and/or may be in communication with the robot 11 only via the network 34. The remote and local control terminals 32, 46 may be configured in a mirrored arrangement or may be configured in a collaborative, work/task sharing arrangement.

In a mirrored arrangement, the communications processor 36 may prioritize the command signals from the control terminals 32, 46 according to a pre-determined scheme. For example, the local control terminal 46 may be configured with an override ability that may allow a local user to usurp control of the robot 11 from the remote control terminal 32. This mirrored configuration may allow the local user to continue the operation, for example, if the communication link 44 is broken. Conversely, in a collaborative arrangement, each control terminal 32, 46 may be responsible for certain aspects of the robotic control, and they may work in tandem to accomplish a common goal.

To accommodate the relatively low, fixed bandwidth of the communications link 44, the communications processor 36 may be configured to divide the visualization, operational status, and/or robotic control into distinct data streams (e.g., data streams 50, 52, 54, respectively) that may each be communicated over the network 34 via the transceiver according to various communication parameters (e.g., communication protocol, transmission priority, transmission method, transmission format, transmission frequency, update frequency, and/or level of redundancy/error checking) In one embodiment, the manner and/or priority of the data communication may differ based on the criticality and/or importance of the data being transferred. For example, data that is regarded as critical may be transmitted on a data channel that has a higher bandwidth and/or transmission speed and may be subject to more rapid re-polling or greater error checking than data regarded as less critical.

Figure 3:
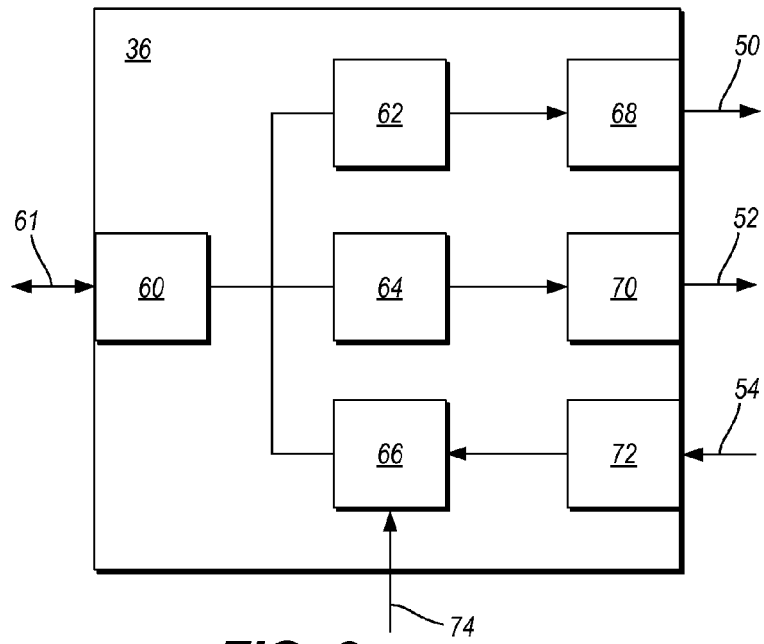
FIG. 3 is a schematic diagram of a communications processor.

FIG. 3 schematically illustrates an embodiment of the communications processor 36, and more particularly shows the processor 36 having a data manager 60 that is configured to transmit/receive a collection of data 61 to/from the local system (e.g., the robot 11 and controller 12). The data manager 60 may divide the collection of data 61 into a plurality of data streams (or consolidate received data), and communicate each data stream with various processing modules (e.g., a visualization processing module 62, an operational status processing module 64, and a control processing module 66). It should be understood that more or fewer processing modules may be incorporated based on the nature of the remote system and types of information that may need to be transmitted over the network. Each processing module 62, 64, 66 may be configured, for example, to receive a data stream from the data manager 60, to determine what types of information must be transmitted (e.g., all data, only data that is new or has recently changed, and/or only data that is specifically requested), and/or to determine and apply the appropriate level of compression or redundancy to the data.

A network interface module 68, 70, 72 may be in communication with each of the respective processing modules 62, 64, 66 and may be configured to facilitate the network connection over the network 34 (via the transceiver 38). The network interface modules 62, 64, 66 may each be capable of bi-directional or uni-directional communication, and may be designated as either a transmitter, receiver, or transceiver. For example, the transmitting network modules 68, 70, may be configured to send visual data 50 and operational data 52 to the remote control terminal 32 via the network 34. The transmitting network modules 68, 70 may packetize the data received from the respectively connected processing modules 62, 64 and may control the frequency at which new data is transmitted (e.g., real-time push transmission, periodic push transmission, publish/subscribe, or request-based transmission). Conversely, the receiving network module 72 may, for example, be configured to receive control data 54 from the network 34, to verify/error check the data 54, and/or to respond to the sender with appropriate checksum values or similar acknowledgements of receipt. The receiving network module 72 may then provide any received data to the control processing module 66, where it may be decompressed, prioritized with local control signals 74, and made available to the controller 12 via the data manager 60.

In an embodiment where a dexterous robot 11 is being controlled via a remote control terminal 32, each of the three respective data streams: i.e., a visual data stream 50, an operational status data stream 52, and a command and control data stream 54 may be assigned a separate priority based on the criticality of the data (e.g., "high," "medium," and/or "low" priority). For example, the command and control data stream 54 may be assigned a "high" priority due to its direct relationship to the movement and control of the robot 11. The visual data stream 50 may be assigned a "medium" priority since the visual feedback may be highly regarded by the user, however, may be less critical than the command data. Finally, the operational status data stream 52 may be assigned a "low" priority since it may be purely informational, and may have no direct bearing on the control of the robot 11.

The assigned priority of the underlying data may dictate the communication parameters assigned or applied to each data stream 50, 52, 54. The communication parameters may, most importantly specify the type of network communication channel used for the data transmission, and the frequency and manner with which the data is updated. Additionally, the communication parameters may specify the communication protocol, the transmission priority, the transmission format, and/or the level of redundancy/error checking that may be employed. For example, the "high" priority command and control data stream 54 may be transmitted continuously in a constant data stream, using a highly reliable link, a relatively large error correction and/or redundancy, handshaking, and/or checksums. The "medium" priority operational status data stream 52 may be transmitted using a periodically updating publish/subscribe methodology, but may include less error checking/validation than the command and control data, or may be transmitted using a comparatively lower performance network channel than the channel used for communicating the command and control data. Finally, the "low" priority visual data stream 50, may be transmitted on an even more narrow transmission channel, using a constant data stream employing only best-efforts updates.

Figure 4:
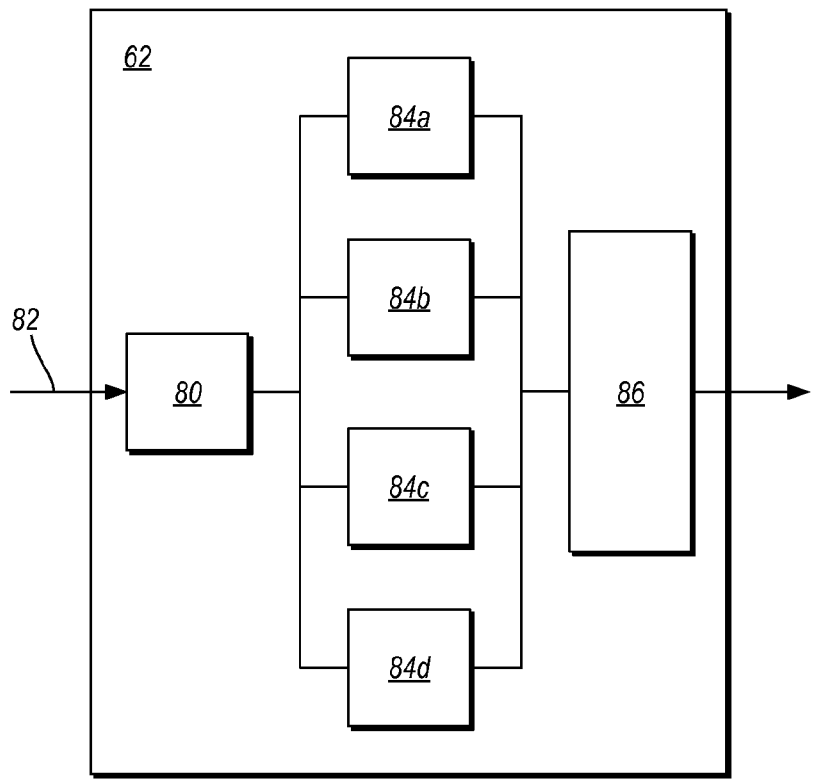
FIG. 4 is a schematic diagram of a visualization processing module.

To further conserve bandwidth, the various data streams 50, 52, 54 may be heavily compressed and/or may employ various other bandwidth-conserving techniques. For example, as generally illustrated in FIG. 4, the visualization processing module 62 may include an image parser 80 that may divide a video feed 82 (consisting of multiple sequenced video frames) into distinct elements, regions or layers (generally referred to as "visual objects"). For example, the video feed 82 may be divided into one or more foreground elements disposed on one or more background layers. Alternatively, the video feed 82 may be subdivided into a plurality of regions (e.g., quadrants), or may be parsed using other suitable division means.

Each visual object may be passed from the image parser 80 to a distinct image processor (e.g., image processors 84a-84d), where the respective visual object may be analyzed for any detectable movement. For example, the image processor may compare a current representation of the visual object to a representation of the same object from a previously acquired video frame. If there is no change, the respective image processor may output, for example, a null set or some other identifier that may indicate no change. If there is a perceived movement, however, the image processor may output the updated visual object to a compression processor 86, where it may be compressed and prepared for transmission over the network 34. Any detected visual change in the object may be viewed as "movement," for example, if the magnitude of the visual change from a previous video frame exceeds a predefined threshold. Additionally, the raw image may be time or frequency filtered to prevent any image artifacts (e.g., artifacts attributable primarily to the image capture device, video compression, and/or data transmission) from being regarded as detectable movement of the object.

Similar to the visualization processing techniques, the command and control data stream 54 and operational status data stream 52 may be configured to conserve bandwidth by only conveying data if the data has changed from a previous transmission. Such a technique may minimize the transmission of redundant data packets when certain aspects of the system are relatively static.

While the present communication system 30 is described with respect to a dexterous robot 11, it should be understood that the communication techniques described herein may apply equally to any other systems or network configurations. While this communication methodology may be particularly suited for high-latency, low-bandwidth applications, such as when communicating with distantly located extra-terrestrial devices, it may be equally beneficial in purely terrestrial applications where bandwidth is constrained or where data transmission is preferably minimized. In one configuration, the present communication techniques may be particularly suitable for networked master-slave robotic applications, or for other system-level communications.

Figure 5:
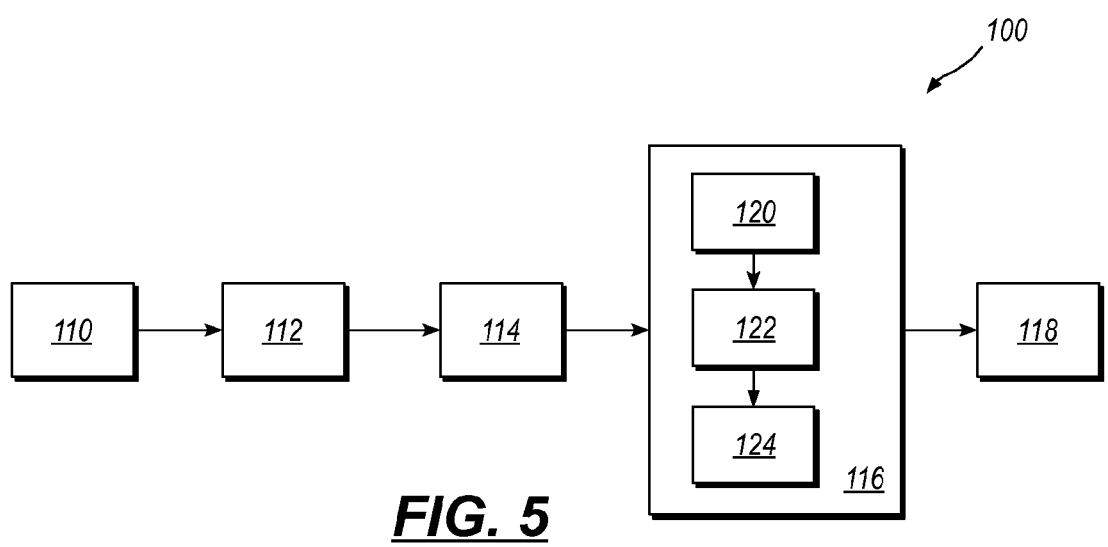
FIG. 5 is a flow diagram of a communication method for use with a high-latency, low-bandwidth data network.

As generally illustrated in FIG. 5, the present communication techniques may be generally illustrated by communication method 100. This method 100 may include dividing a collection of data into a plurality of data streams 110, where each data stream is configured to be transmitted across a network according to a plurality of communication parameters (e.g., communication protocol, transmission priority, transmission method, transmission format, transmission frequency, and/or level of redundancy/error checking). Once divided, each data stream may be assigned a respective priority that reflects the criticality of the data stream 112. The method 100 may further include adapting a communication parameter for at least one of the plurality of data streams to reflect the priority of the data stream 114, and transmitting the plurality of data streams according to the adapted communication parameters 118.

To further account for fixed bandwidth constraints, the method 100 may include employing bandwidth conserving techniques 116 to minimize the amount of redundant or static information within the transmitted data stream. Such bandwidth conserving techniques may include parsing the data into a plurality of objects 120, comparing an object to a previously recorded version of the object 122 to detect a change in the object, and transmitting the object only if the change from the previously recorded version of the object exceeds a threshold 124.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A communication system comprising:
a communications processor configured to receive a collection of data from a local system; and
a transceiver in communication with the communications processor and configured to transmit and receive data over a network according to a plurality of communication parameters;
wherein the communications processor is configured to divide the collection of data into a plurality of data streams; to assign a priority level to each of the respective data streams, the priority level reflecting the criticality of the respective data stream; and to modify a communication parameter of at least one of the plurality of data streams according to the priority of the at least one data stream; and
wherein the communications processor further includes a processing module configured to receive at least one of the plurality of data streams and to perform a bandwidth conserving technique to minimize the amount of redundant information within the transmitted data; and
wherein the bandwidth conserving technique includes:
parsing the one data stream into a plurality of objects;
comparing an object of the plurality of objects to a previous version of the object to detect a change in the object; and
transmitting the object only if the change from the previously recorded version of the object exceeds a threshold.

2. The communication system of claim 1, wherein the plurality of communication parameters includes at least one of a communication protocol, a transmission priority, a transmission method, a transmission format, a transmission frequency, an update frequency, a level of redundancy, and a level of error checking.

3. The communication system of claim 1, wherein the local system includes a dexterous robot and a controller.

4. The communication system of claim 3, wherein the dexterous robot includes 42 degrees of freedom.

5. The communication system of claim 3, wherein the plurality of data streams includes a visual data stream, an operational status data stream, and a command and control data stream.

6. A method for communicating data over a high-latency, low-bandwidth network comprising:
dividing the data into a plurality of data streams, each data stream configured to be respectively transmitted across a network according to a plurality of communication parameters;

assigning a priority to each respective data stream, the priority reflecting the criticality of the respective data stream;

adapting a communication parameter for at least one of the plurality of data streams to reflect the priority of the at least one data stream;

transmitting the plurality of data streams using the communication parameters; and performing a bandwidth conserving technique on at least one of the plurality of data streams to minimize the amount of redundant information within the transmitted plurality of data streams, and wherein the bandwidth conserving technique includes:

parsing the at least one data stream into a plurality of objects;

comparing an object of the plurality of objects to a previous version of the object to detect a change in the object; and transmitting the object only if the change from the previously recorded version of the object exceeds a threshold.

7. The method of claim 6, wherein the plurality of communication parameters includes a communication protocol, a transmission priority, a transmission method, a transmission format, a transmission frequency, an update frequency, a level of redundancy, or a level of error checking.

8. The method of claim 6, wherein transmitting the plurality of data streams includes transmitting each respective data stream on a distinct network channel.

9. A communication system comprising:

a communications processor configured to receive a collection of data from a robotic system; and a transceiver in communication with the communications processor and configured to transmit and receive data over a network according to a plurality of communication parameters;

wherein the communications processor is configured to:

divide the collection of data into a plurality of data streams;

assign a priority level to each of the respective data streams, the priority level reflecting the criticality of the respective data stream; and modify a communication parameter of at least one of the plurality of data streams according to the priority of the at least one data stream; and wherein the plurality of data streams includes a visual data stream, an operational status data stream, and a command and control data stream; and wherein the communications processor further includes a processing module configured to receive at least one of the plurality of data streams and to perform a bandwidth conserving technique to minimize the amount of redundant information within the transmitted data; and wherein the bandwidth conserving technique includes:

parsing the one data stream into a plurality of objects;

comparing an object of the plurality of objects to a previous version of the object to detect a change in the object; and transmitting the object only if the change from the previously recorded version of the object exceeds a threshold.

10. The communication system of claim 9, wherein the plurality of communication parameters includes at least one of a communication protocol, a transmission priority, a transmission method, a transmission format, a transmission frequency, an update frequency, a level of redundancy, and a level of error checking.

\* \* \* \* \*